United States Patent [19]

Hokanson

[11] 3,777,740

[45] Dec. 11, 1973

[54] METHOD AND APPARATUS FOR NON-INVASIVELY VISUALIZING BLOOD VESSELS

[75] Inventor: David Eugene Hokanson, Mercer Island, Wash.

[73] Assignee: The United States of America as represented by the Administrator for Veterans Affairs, Washington, D.C.

[22] Filed: Oct. 21, 1971

[21] Appl. No.: 191,399

[52] U.S. Cl.......... 128/2 V, 73/67.8 S, 128/2.05 Z, 128/24 A
[51] Int. Cl............................................. A61b 10/00
[58] Field of Search............ 128/2 V, 2 R, 2.05 ZR, 128/24 A; 73/67.8, 67.9

[56] References Cited
UNITED STATES PATENTS

| | | | |
|---|---|---|---|
| 3,086,390 | 4/1963 | Brown............................ | 128/2 V X |
| 3,439,530 | 4/1969 | Flaherty et al. ................ | 73/67.8 S |
| 3,577,772 | 5/1971 | Perilhou et al. ................ | 128/2 V X |
| 3,631,849 | 1/1972 | Norris ........................... | 128/2.05 Z |
| 3,023,611 | 3/1962 | Howry ........................... | 128/2 V |
| 3,442,579 | 5/1969 | Friedberg....................... | 73/67.7 X |
| 3,605,724 | 9/1971 | Flaherty......................... | 128/2 V |
| 3,308,652 | 3/1967 | Appel et al. ................... | 128/24 A |
| 3,247,709 | 4/1966 | Gordon.......................... | 128/2 V |
| 3,480,002 | 11/1969 | Flaherty et al. ............... | 128/2 V |
| 3,690,311 | 9/1972 | Schorum et al. ............... | 128/2 V |

*Primary Examiner*—Kyle L. Howell
*Attorney*—Norman J. Latker and Thomas G. Ferris

[57] ABSTRACT

Apparatus for transcutaneously producing visual images of the internal dimensions of blood vessels in the human body is disclosed including an ultrasonic pulsed Doppler blood velocity detector having a transducer adapted to transmit a beam of ultrasound toward a blood vessel and detect ultrasound reflected from moving blood particles. The transducer is held by a mechanical arm capable of sensing the position and orientation of the transducer. The position and orientation of the transducer are combined with the distance of the blood vessel therefrom to locate the beam of an oscillographic storage display unit. A frequency detector is employed to intensify the beam of the storage display unit to write a spot on the display whenever the output of the pulsed Doppler is above a pre-set amplitude and frequency indicating blood flow within the blood vessel.

Method of use of the disclosed apparatus to produce visualizations of blood vessels in the human body are also disclosed.

16 Claims, 10 Drawing Figures

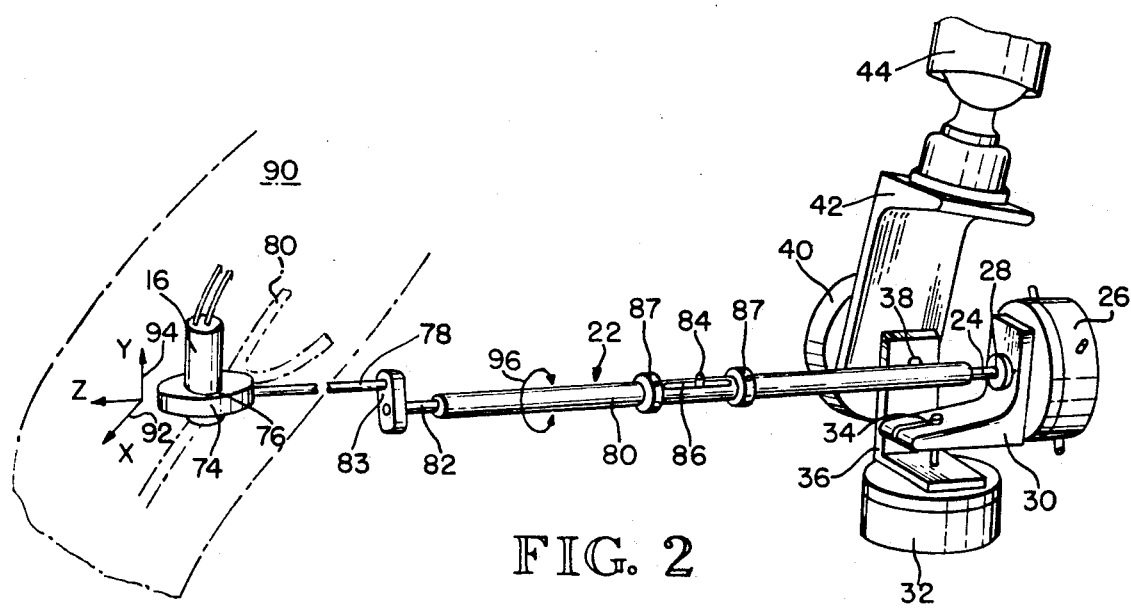
FIG. 2
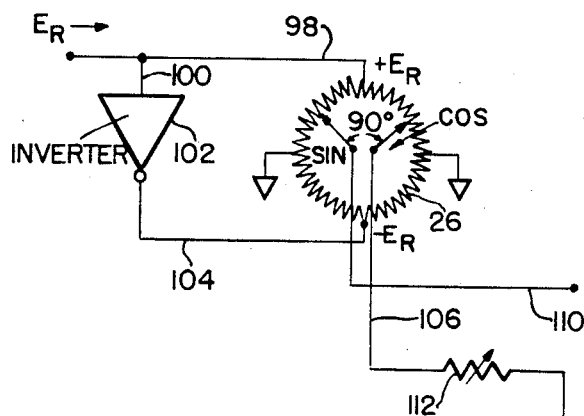
FIG. 3
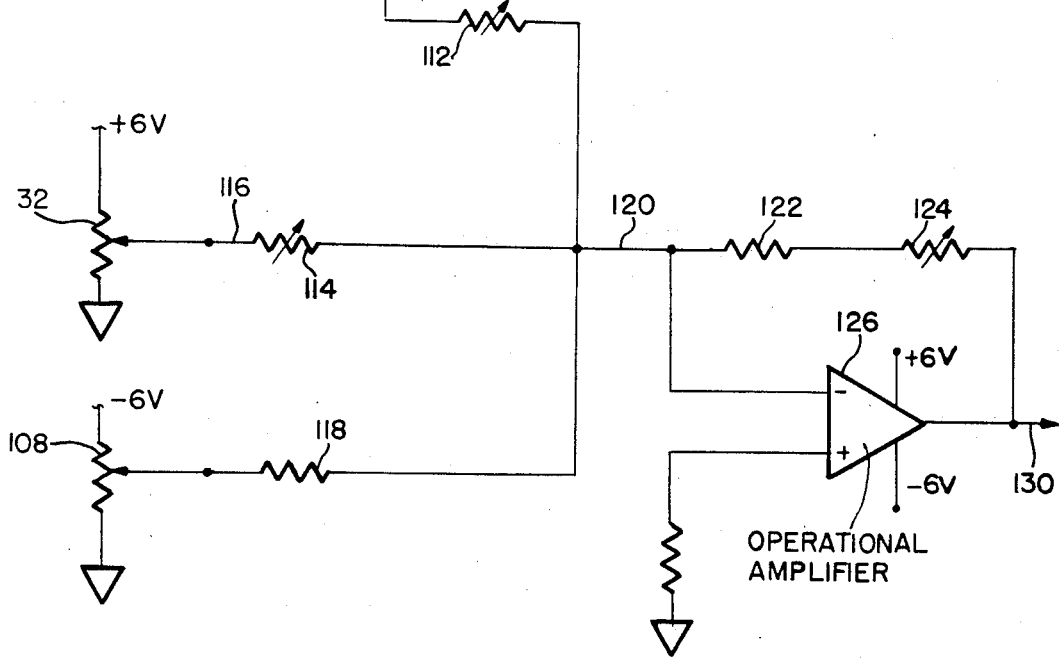

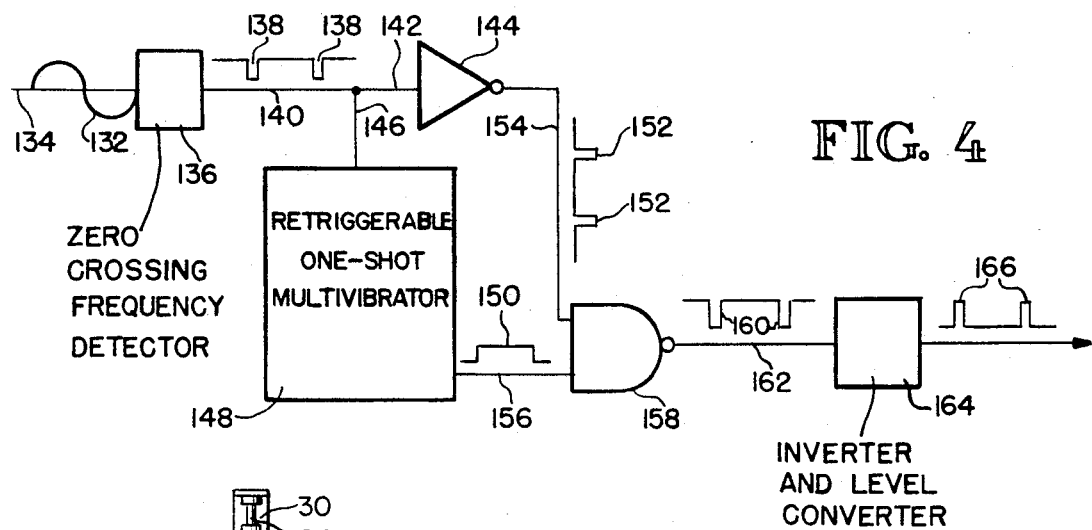
FIG. 4
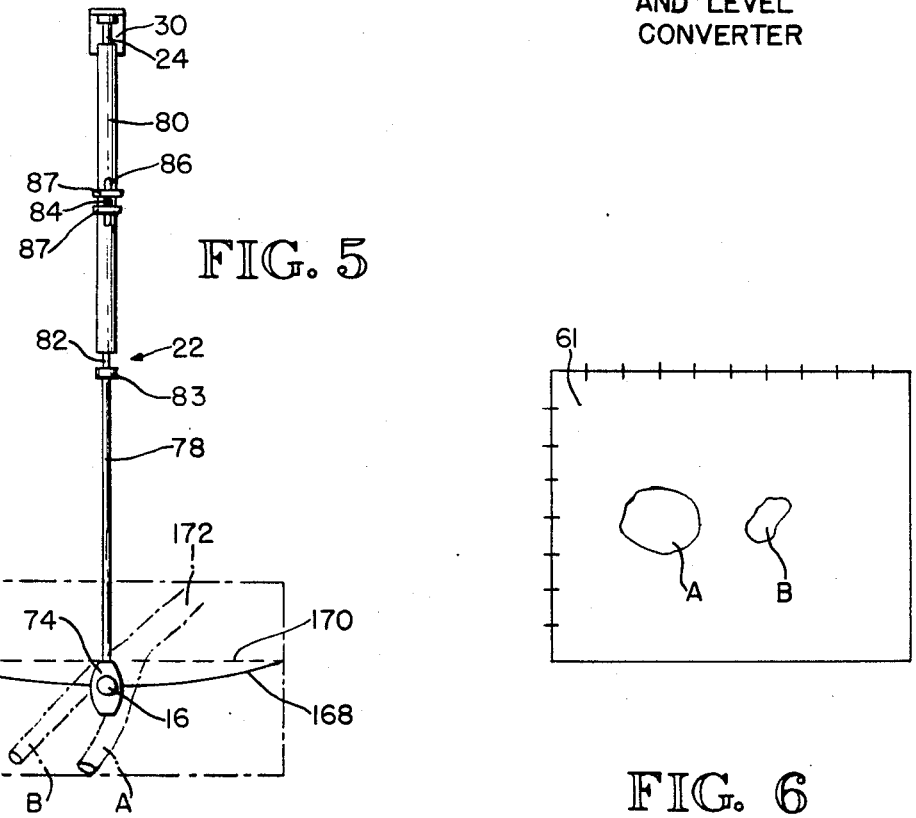
FIG. 5
FIG. 6

METHOD AND APPARATUS FOR NON-INVASIVELY VISUALIZING BLOOD VESSELS

BACKGROUND OF THE INVENTION

1. Field of the Invention

This invention relates to methods and apparatus for non-invasively visualizing the internal dimensions of blood vessels within the human body, and more particularly, to methods and apparatus for sensing the position of the small volume sampled by the ultrasonic pulsed Doppler blood velocity detector with respect to a region of the human body to be scanned, translating this position information to locate the beam of an oscillographic storage display unit and intensifying the beam of the display unit to write a spot on the storage display when the pulsed Doppler output indicates blood flow.

2. Description of the Prior Art

X-ray arteriography using transarterial dye injection is currently widely used in the diagnosis of occlusive arterial lesions. Prior to the instant invention, no method of evaluation other than X-ray arteriography has been able to provide the anatomic detail necessary to formulate a therapeutic plan. The use of this procedure has been restricted however, by the facts that patient discomfort and some risk are unavoidably associated with such an examination. In certain areas of the body, such as the coronary and carotid vessels, X-ray arteriography also carries a significant mortality.

Continuous wave Doppler velocity detectors which sense the velocity of moving blood transcutaneously by directing a low power beam of ultrasound toward a blood vessel and detecting ultrasound which is reflected from moving particles in the blood and which is shifted in frequency according to the Doppler effect are now in common use. The frequency difference between the transmitted and reflected ultrasound is in the audible range for blood flow for instruments employing ultrasound in the 2.5 to 10 MHz range. This frequency difference has been amplified to provide an audio output frequency proportional to the velocity of the blood flow. Since the power level of ultrasound is low, it has no harmful effects on tissue.

The use of ultrasonic pulsed Doppler blood velocity detectors to sense blood flow is also known. Whereas the continuous wave Doppler velocity detector senses flow everywhere in the beam of ultrasound cast by its transducer, the pulsed Doppler device is able to sample a small region at any desired distance from its transducer by repetitively transmitting a short burst of ultrasound and sampling the return signal after a short delay corresponding to the transit time of the sound to and from the region of interest. The use of a pulsed ultrasonic Doppler to sense blood flow has been described by various investigators such as: P. A. Peronneau and F. Leger, in the Proceedings of the 22nd Annula Conference on Engineering in Medicine and Biology, Session 10–11, 1969; F. D. McLeod, in the Proceedings of the 23rd Annual Conference on Engineering in Medicine and Biology, p. 271, 1970; and, D. W. Baker at I.E.E.E. Transactions on Sonic and Ultrasonics, SU–17, p. 170, 1970.

BRIEF SUMMARY OF THE INVENTION

The present invention provides an apparatus for developing the image of the lumen of a blood vessel on an oscillographic storage display by scanning a selected region of human tissue with an ultrasonic pulsed Doppler velocity detector and mapping the regions of flowing blood. As disclosed herein, the transducer of the pulsed Doppler is supported by a mechanical arm including means capable of sensing the position and orientation of the transducer. In one mode of use, this support limits the movement of the transducer to a single plane while additionally allowing rotation in this single plane of movement. The sound beam emitted by the transducer is, of course, also constrained to move in a single plane. The position of the transducer as sensed by its support and the distance of the subcutaneous sample region from the transducer are used to locate the beam of the oscillographic display unit such that movement of the transducer and the ultrasonic beam emitted thereby is reflected by related movement of the oscillograph beam. A frequency detector intensifies the beam and writes a spot on the storage display whenever the frequency output of the pulsed Doppler is above a pre-set amplitude and frequency. This frequency threshold prevents low velocity transducer movements and noise from producing false indications of blood flow on the display. In one form of use, the position sensing arm having the pulsed Doppler's transducer mounted thereon is oriented so that the cross-sectional area of the tissue of interest lies in the plane of movement allowed the transducer's sound beam. Next the oscillographic display unit is placed into its 23 write" mode so that spots which represent regions of blood flow will be stored on the display, and the transducer is then moved manually over the plane of interest while the range of the sample region is varied until the entire area represented by the display has been covered. Wherever blood flow having a velocity sufficient to produce a frequency above the minimum required to pass the frequency detector is encountered a spot will remain on the display so that a map is formed corresponding to the lumen of the artery or vein scanned. Visualizations of both longitudinal and transverse sections of blood vessels may be produced. The transverse sections, which have great potential value not only in detecting the existence of an occlusion but also in defining the extent of a stenosis, are views which have heretofore not been available through the use of any other means.

It is an object of the present invention, therefore, to provide methods and apparatus for non-invasively producing a subcutaneous visualization of the lumen of a blood vessel.

Another object of the present invention is to provide methods and apparatus employing an ultrasonic Doppler blood velocity detector to produce a subcutaneous visualization of the lumen of a blood vessel.

One more object of the present invention is to provide apparatus for supporting and sensing the position and orientation of the transudcer of an ultrasonic Doppler blood velocity detector.

Still another object is to provide apparatus employing an ultrasonic Doppler blood velocity detector to produce a visualization of the lumen of a blood vessel on an oscillographic storage display unit.

Another object is to provide apparatus for sensing the position and orientation of the transducer of a pulsed Doppler blood velocity detector and for controlling the distance from the transducer of the tissue section scanned and translating this information to an oscillographic display unit to locate the beam of the display unit.

One more object of the present invention is to provide means for sensing and measuring the output of an ultrasonic Doppler blood velocity detector and directing the beam of an oscillographic display unit to write a spot on the display when the pulsed Doppler output is above a determined frequency and amplitude.

Still another object of the present invention is to provide a method and apparatus for producing transverse cross-sectional visualizations of the lumen of a blood vessel.

An additional object is to provide a method and apparatus employing an ultrasonic pulsed Doppler blood velocity detector to produce transverse cross-sectional visualizations of the lumen of a blood vessel.

Other and additional objects and advantages of the present invention will be apparent from the following description taken in conjunction with the accompanying drawings.

BRIEF DESCRIPTION OF THE DRAWINGS

FIG. 2 is a partial perspective view of the transducer support of the instant invention, including a transducer shown positioned over an artery in a human leg.

FIG. 3 is a schematic diagram illustrating typical circuitry for moving the beam of a display unit to correspond to proportional change in the position of the small volume of tissue sampled by the pulsed Doppler.

FIG. 4 is a schematic diagram illustrating typical circuitry for measuring the output of the pulsed Doppler and intensifying the beam of an oscillographic display unit.

FIG. 5 is a plan view illustrating one typical mode of use of the instant invention to produce a transverse cross-sectional view of the lumen of a human blood vessel.

FIG. 6 is a schematic view illustrating the form of visualization produced on the display unit by the mode of use of the instant invention disclosed in FIG. 5.

DETAILED DESCRIPTION OF THE INVENTION

Figure 1:
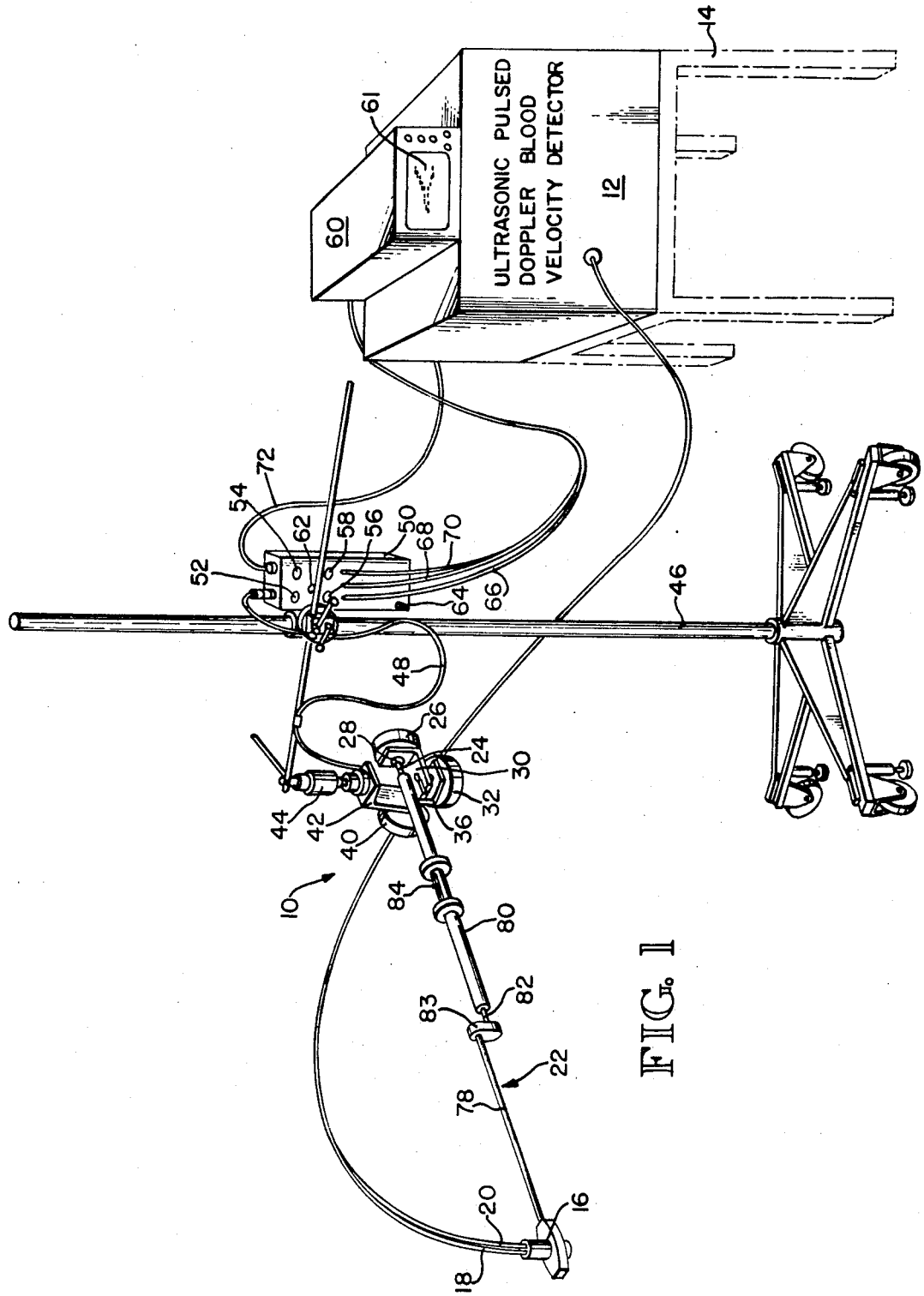
FIG. 1 is a perspective view of apparatus typifying the instant invention and adapted to non-invasively visualize blood vessels.
Figure 9:
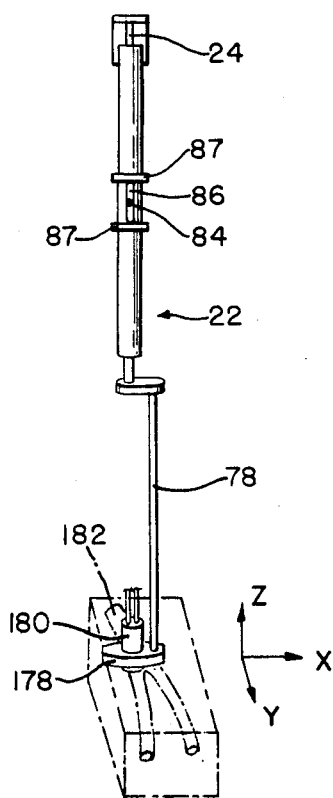
FIG. 9 is a partial perspective view of the instant invention illustrating a third typical mode of use of the instant invention wherein the transducer is mounted longitudinally on its support arm.

Referring initially to FIG. 1, apparatus 10 adapted to non-invasively visualize blood vessels is disclosed, including a pulsed Doppler 12 mounted on a support table 14, and including a transducer 16 connected thereto by means of wires 18 and 20. Transducer 16 is mounted at one end of offset elongate support arm 22 such that the crystal of the transducer is on the axis of the arm which extends outwardly from shaft 24 of angle sensing potentiometer 26. Shaft 24 of potentiometer 26 extends through and is held in a hole 28 in one arm of L-shaped support 30. L-shaped support 30 is itself mounted for pivotal movement on the shaft of position sensing potentiometer 32 which extends through a hole 34 in one leg of L-shaped support 36, while L-shaped support 36 is pivotally mounted on the shaft 38 of position sensing potentiometer 40 which extends through a hole in one leg of L-shaped bracket 42. From the above, it will be understood that potentiometer 26 is adapted to sense the angular rotation of transducer 16 and arm 22 on which it is fixedly mounted, while potentiometer 32 senses the movement of the transducer in the lateral direction while potentiometer 40 senses the movement of the transducer in the vertical direction. It is contemplated that sensing means such as optical or mechanical angular encoders or angular resolvers might be satisfactorily substituted for the potentiometers, and these variations are considered to be within the scope of the present invention. In some modes of use, transducer 16 is mounted on arm 22 to transmit a beam of ultrasound in directions perpendicular to the arm while the three potentiometers 26, 32 and 40 support the arm at its origin and sense the position of the arm with respect to the origin. In another mode of use transducer 16 is mounted to transmit ultrasound axially outward from arm 22 on a line defined by potentiometer shaft 24 (FIG. 9). L-shaped support 42 is fixedly mounted to universal socket 44 of conventional support stand 46. It will be understood that support stand 46 forms no part of the instant invention and that any support stand allowing convenient movement and positioning of the transducer with respect to the subject to be scanned is satisfactory.

Cable 48 interconnects the potentiometers with the control box 50 mounted on the support stand 46. Control box 50 includes multiple pulsed Doppler adjustment knob 52, image magnification control knob 54, lateral offset control knob 56, and vertical off-set control knob 58 for the beam of oscillographic storage display unit 60, unblanking circuit control switch 62 which allows the beam of the display unit to be placed on the display screen prior to scanning, and finally, on-off switch 64. In the illustrated embodiment, leads 66, 68 and 70 run from control box 50 to the oscillographic storage display unit, lead 66 being related to the beam intensity modulation control, lead 68 being related to the lateral position adjustment of the display unit beam, while lead 70 relates to the vertical position adjustment of the display unit beam. It is contemplated that other lead arrangements may be provided to accomplish similar ends.

Lead 72 runs from the pulsed Doppler unit 12 to control box 50 and transmits an audio signal from the pulsed Doppler which corresponds in frequency and amplitude to flow information gathered by the transducer 16. In the control box this audio signal is sensed to determine whether the beam of the display unit should be intensified to write a spot on the display screen 61. In addition, cable 72 transmits to the control box a voltage proportional to the distance of the sample volume from the transducer where it is inverted and both it and its complement are transmitted by cable 48 to angle sensing potentiometer 26.

Oscillographic storage display unit 60 is of the conventional type, and in one embodiment of the instant invention, a Hewlett Packard, Model 1331A has been used satisfactorily. Ultrasonic pulsed Doppler blood velocity detector 12 is also of known construction, and in particular, the construction and use of a device of this type has been described in the above article by D. W. Baker and in other articles available to one skilled in the art.

Referring now to FIG. 2, a more detailed view of one configuration of the position sensing arm which holds the transducer of the ultrasonic pulsed Doppler is disclosed. Elongate arm 22 includes a head 74 having a hole 76 through which transducer 16 extends and is held therein by conventional fastener means. Elongate arm 22 includes a hollow tubular outer section 80 in which rod 82 is mounted for reciprocal movement. Rod 82 is connected to rod 78 on which the transducer support head 74 is mounted through lateral offset member 82 whereby the crystals within transducer 16 are axially aligned with rod 82 and the shaft of potentiometer 26. Inner rod 82 includes laterally projecting pin 84 which extends through longitudinal slot 86 in tube 80. In one embodiment of the present invention, slot 86 is approximately two inches long such that in one mode of use the length of the transducer support arm may be varied within this range to allow easy positioning of the transducer over a blood vessel to be scanned and to further allow for the production of cross-sectional blood vessel visualizations on the display screen of three dimensional tissue sections as will be described more completely hereafter. Collars 87 are slidably mounted on tube 80 adjacent slot 86 and are adapted to be releasably fixed thereon by means of set screws or the like. In the first mode of sensing to be described hereafter the collars are positioned to hold pin 84 in the center of slot 86 and the apparatus is calibrated to this center-length of the arm to allow the reading of exact blood vessel dimensions from the display screen.

As illustrated in FIG. 2, transducer 16 has been positioned by manipulation of the mechanical stand substantially over an artery 88 in human leg 90. As has been described briefly above, elongate arm 22 is mounted at its origin distal from the transducer such that the transducer, without movement of pin 84 in slot 86, is limited to translational movement in the x direction indicated by arrow 92 and the y direction indicated by arrow 94, and for rotation as indicated by arrow 96 within the plane defined by arrows 92 and 94.

As stated above, the transducer is mounted on the elongate position sensing arm 22 such that its ultrasound emitting crystal is on the main longitudinal axis of the arm and thus it will be understood that the position of the crystal may be represented by the following equations:

$$x = l\theta_1$$
$$y = l\theta_2$$

Where $l$ is the length of the arm from its mounting origin to the center of the transducer 16, and $\theta_1$ and $\theta_2$ are the angles of deflection of the elongate arm respectively in the $x$ and $y$ directions. In one embodiment of the invention, arm 22 has a center length of 13 inches with its actual length being variable between 12 and 14 inches depending upon the location of pin 84 in slot 86. The $x$ and $y$ coordinates define the position of the transducer on the surface of a sphere having a radius 1. Since this sphere is large compared to the size of the areas to be visualized which may be 4 × 5 or 8 × 10 centimeters depending on the magnification setting of knob 54 on the control box 50, the region of the surface of the sphere is represented by the plane screen of the display with little distortion. In what will be described hereafter as a mode II scan, variation in the length of the arm allows the scanning of a region having a 2 inch depth making it easier in longitudinal scans to position the plane of the scan so as to cut through the blood vessel to be visualized.

The distance of the sample volume from the transducer is indicated by a range voltage from the pulsed Doppler. This voltage $E_R$ and its complement $-E_R$, are applied to the terminals of sine-cosine potentiometer 26. In use, rotation of the transducer on arm 22 is sensed by the sine-cosine potentiometer and thus the coordinates of the sample volume may be represented as follows:

$$x = l\theta_1 + E_R \cos\alpha$$
$$y = l\theta_2 + E_R \sin\alpha$$

where $\alpha$ is the angle of rotation of the transducer. Simultaneously, a constant voltage is applied through control box 50 to both lateral or $x$ position sensing potentiometer 32 and vertical or $y$ position sensing potentiometer 40. FIG. 3 illustrates a typical circuit for scaling and summing the position and range voltages to deflect the beam of the display unit. As illustrated, FIG. 3 represents a lateral or $x$ deflection circuit, but it will be understood the vertical or $y$ deflection circuit is substantially identical and has not been illustrated for drawing convenience. Range voltage $E_R$ from the pulsed Doppler, which, as stated above, is a voltage proportional to the distance of the sample volume from the transducer is connected through lead 98 and through lead 100, inverter 102 and lead 104 to sine-cosine potentiometer 26. In one embodiment of the instant invention, a Bourns Model No. 3415N-53-502 sine-cosine potentiometer has been satisfactorily used. The output voltage of the potentiometer 26 on lead 106, which may be represented as $E_R \cos\alpha$, is combined with the $x$ position voltage from potentiometer 32 and a pre-set offset voltage from potentiometer 108 to position the beam of the display unit with respect to the $x$ direction. It will be understood that the output voltage $E_R \sin\alpha$ on lead 110 is likewise employed in conjunction with the $y$ position voltage from potentiometer 40 and a $y$ offset voltage to position the beam of the display unit with respect to the $y$ direction.

Referring again to FIG. 3, variable resistor 112 which is mounted on lead 106, and variable resistor 114 mounted on lead 116, are adjusted during calibration of the unit prior to use so that the range and position voltages cause deflection of the display beam corresponding directly to the position of the sample volume when magnification control knob 54 is in the times one position. In one embodiment of the instant invention, the potentiometer 32, of the 5,000 ohm, single turn variety (Bourns Model No. 34155-1-502), has been supplied with a constant voltage of 6 volts. In use, the potentiometer 32 is oriented so that the wiper does not cross the discontinuity from plus 6 volts to ground during a scan. The shaft of potentiometer 32 is connected to the elongate arm 22 through L-shaped bracket 30 in a manner such that motion of the transducer in the $x$ direction turns the shaft and wiper of the $x$ direction sensing potentiometer. Similarly, motion of the transducer in the $y$ direction turns the shaft and wiper of potentiometer 40 and it will be understood that the output of potentiometer 40 is combined with the output voltage from lead 110 ($E_R \sin\alpha$) to produce the y deflection voltage. The output voltage of potentiometer 32 is proportional to the lateral or x position of the crystal of transducer 16. In one embodiment of the invention, variable resistor 112 has a value of 100,000 ohms while variable resistor 114 has a value of 20,000 ohms.

In one application of the instant invention, minus six volts has been supplied to a potentiometer 108 of the 5,000 ohms, ten turn type to produce an offset voltage of arbitrary value which may be added to the lateral position and orientation voltages in order to position the beam of the oscilloscope in the x direction so that it will be on the display screen. The voltages from potentiometers 26, 32 and 108 are fed through lead 120 to an operational amplifier circuit where they are scaled and summed. In one embodiment, this circuit has included 50,000 ohm resistor 122, 0–50,000 ohm variable resistor 124, and operational amplifier 126. The output voltage at lead 130 positions the beam of the oscillographic display unit with respect to the lateral or x direction of movement of the transducer. As has been set forth above, the position of the beam of the transducer with respect to the vertical or y direction is controlled in like manner by a similar circuit employing the $E_R \sin\alpha$ output of potentiometer 26, the output of potentiometer 40 and the output of a positioning potentiometer performing the same function as potentiometer 108. The 0–50,000 ohm variable resistor 124 of the x displacement circuit is ganged together with its counterpart in the y displacement circuit so that the gain of these two circuits is always identical.

The output of the pulsed Doppler is an audio frequency which is proportional to the velocity of the blood flow detected. Since transducer motion causes low audio frequencies, a frequency detector or threshold is employed to separate blood flow signals from those caused by transducer motion. When the audio output of the pulsed Doppler rises above the frequency threshold unblanking pulses are sent to the display unit which causes the beam to write a spot which indicates that blood vessel flow has been detected at that position. FIG. 4 illustrates the circuitry of one embodiment of a frequency threshold detector which has been used with the instant invention. Audio frequency 132 from the pulsed Doppler is fed on lead 134 to a conventional zero crossing frequency detector 136 which produces a pulse each time the frequency of the pulsed Doppler output crosses the zero point. Pulses 138 are carried by leads 140 and 142 to inverter 144 and by leads 140 and 146 to a retriggerable one shot multivibrator 148 which produces an extended pulse 150. Inverted pulses 152 and extended pulse 150 are fed on leads 154 and 156 respectively, to logic gate 158 of the type which produces a low output pulse 160 only when it simultaneously receives high pulses 152 and 150. The low output pulse 160 from logic gate 158 is fed on lead 162 through inverter and level converter 164 to produce a voltage pulse 166 suitable for use in unblanking the oscilloscope.

Referring now to FIG. 5, a first mode of use of the apparatus of the instant invention to produce a visualization on the oscilloscope screen 61 shown in FIG. 6 is disclosed. In this mode I use, adjustable rings 87 are moved toward each other and fixed on the hollow tube 80 to hold pin 84 in the center of slot 86 such that the length of transducer support arm 22 is fixed thereby limiting the movement of transducer 16 to translational and rotational movement on a surface 168 corresponding to a section of the surface of a sphere having a radius equal to the length of arm 22. The curved transducer scan is approximated on the display screen 61 as the surface indicated by straight line 170. Where the length of line 168 varies between 4 and 8 centimeters and the fixed length of arm 22 is approximately 33 centimeters the maximum distortion error produced by this approximation is 0.25 percent.

The transducers of known ultrasonic pulsed Doppler blood velocity detectors sense sample volumes of subcutaneous tissue having diameters in the range of 2.5 millimeters. Thus, it will be understood that a blood vessel 172 having branches A and B located within a human body is visualized by repeatedly sensing the condition of the flow of blood within the multiplicity of sample volumes which define plane 168.

The mode I scan may be used to produce transverse cross-sectional visualizations of the lumen of a blood vessel of the type disclosed in FIG. 6. These transverse sections which have great potential value not only in detecting the existence of an occlusion but also in defining the extent of a stenosis, are views which are not available through the use of other known means.

Figure 7:
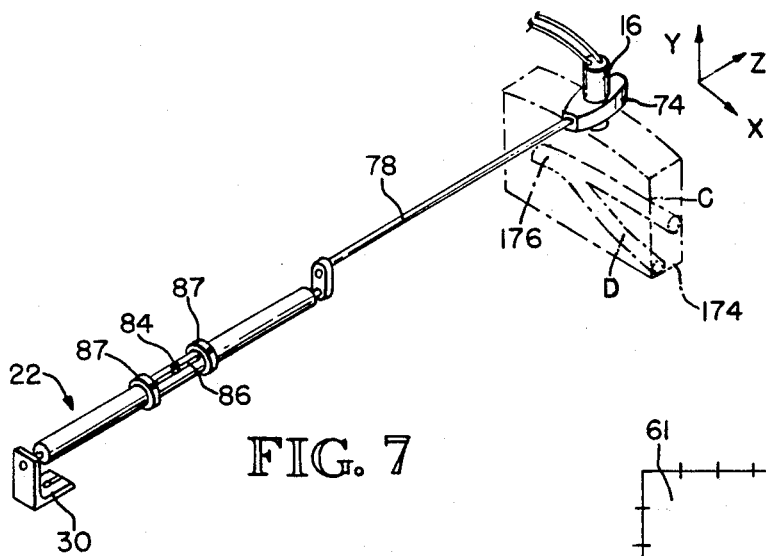
FIG. 7 is a partial perspective view of the instant invention illustrating a second typical mode of use of the instant invention wherein the length of the transducer support arm is varied.
Figure 8:
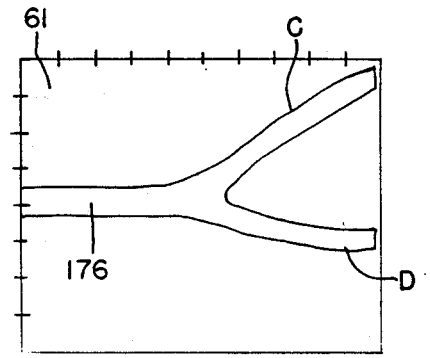
FIG. 8 is a schematic view illustrating the form of visualization produced on the display unit by the mode of use of the instant invention disclosed in FIG. 7.

Referring now to FIG. 7, a second mode of use of the apparatus of the instant invention is disclosed wherein rings 87 are positioned to allow pin 84 to be moved longitudinally in slot 86 to vary the length of transducer support arm 22. Thus, in this mode II use, transducer 16 may not only be moved translationally and rotationally in the x, y plane, but additionally, may be moved in the z direction. It will thus be understood that the mode II scan covers a volume of subcutaneous tissue such as that illustrated by dashed lines 174. This mode II scan is particularly useful for producing longitudinal visualizations of blood vessels which do not lie solely in the x, y plane such as that shown in FIG. 8. Variation of the length of the arm 22 allows the transducer to follow the blood vessel in the z direction. The mode II scan produces a projection and superposition of the blood vessel in the subcutaneous volume 174 as if observed from the origin of the arm 22. Use of the variable length arm makes the positioning of the origin such that the transducer is adjacent the blood vessel to be scanned less critical, but this projection makes all vessels in the section 174 appear to be in the same x, y plane on the display screen 61 although they may not be. The thickness of volume 174 in the z direction may be varied depending on the longitudinal spacing of the collars.

Figure 10:
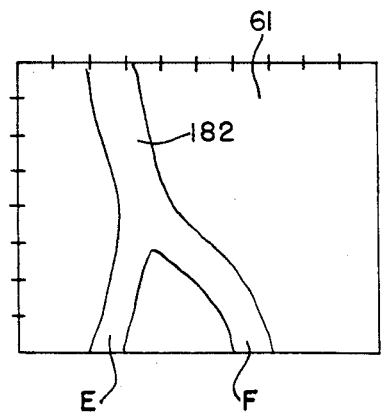
FIG. 10 is a schematic view illustrating the form of visualization produced on the display unit by the mode of use of the instant invention disclosed in FIG. 9.

Referring now to FIG. 9, a third mode of use of the apparatus of the invention in conjunction with a continuous wave Doppler blood velocity detector is disclosed. In this mode III embodiment, the holding member 178 for the transducer 180 of the continuous wave Doppler is repositioned on support rod 78 such that the transducer is held so that its sound beam is transmitted along the main axis of the support arm 22. Rings 87 are spaced apart to allow variation in the length of arm 22 such that the transducer may follow the skin contour above the subcutaneous section to be scanned. As illustrated in FIG. 9, the transducer is oriented such that the x and y axes are generally in the plane of the subject's skin, rather than horizontal and vertical as in the mode I and II scans. The use of the continuous wave Doppler in place of the pulsed Doppler eliminates the depth sensing capability of the apparatus and thus, as seen in FIG. 10, a visualization is produced on the oscilloscope screen in which all vessels appear to lie in the same plane notwithstanding depth variations within the scanned subcutaneous volume. The mode III scan is similar, although obtained non-invasively, to the visualization produced by a conventional X-ray and is perhaps best used for visualizing branching arteries such as 182 lying at the same depth below the skin of the subject. As in a mode II scan, the projection appears to be a view from the origin of the arm. The reorientation of the $x, y$ planes in the mode III scan, eliminates the need for angle sensing potentiometer 26 and thus prior to scanning the range voltage which is applied to the sine-cosine potentiometer 26 is set to zero to eliminate its contribution to the position of the beam of the oscilloscope.

From all of the above, it will be understood that the instant invention provides a safe, low cost means for non-invasively visualizing human blood vessels and for producing visualizations of a type heretofore unobtainable. The invention may be embodied in other specific forms without departing from the spirit or central characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. Apparatus for non-invasively visualizing blood vessels within a body comprising:
    transducer means to direct ultrasound toward a sample volume within said body and detect ultrasound reflected therefrom, said transducer means including an ultrasonic constant frequency pulsed Doppler blood velocity detector means,
    support means for said transducer to sense the position and orientation thereof;
    means to combine the position and orientation of said transducer with the distance of said transducer from said sample volume to locate the beam of a display unit on a display screen; and,
    means to measure said reflected ultrasound and cause the beam of said display unit to write a spot on said display screen when the frequency and amplitude thereof is above a pre-set level, said means including frequency discriminating means.

2. The apparatus of claim 1 wherein said transducer means includes ultrasonic pulsed Doppler blood velocity detector means employing ultrasound in the 2.5 to 10 MHz range.

3. The apparatus of claim 1 wherein the support means for said transducer includes an elongate arm extending from an origin and mounting said transducer distal said origin for rotational and translational movement with respect thereto.

4. The apparatus of claim 1 wherein the support means for said transducer includes an elongate arm extending from an origin and mounting said transducer distal said origin, said origin including a universal type mounting such that said transducer may be moved rotationally and translationally on a spherical surface having a radius equal to the length of said elongate arm.

5. The apparatus of claim 4 wherein the length of said elongate arm is adjustable such that said transducer may be moved rotationally and translationally in the region between a pair of spherical surfaces having radii equal to the shortest and longest lengths of said arm.

6. The apparatus of claim 1 wherein the means sensing the position and orientation of said transducer include potentiometer means mounted on said support means to individually sense lateral, vertical and rotational movement of said transducer.

7. The apparatus of claim 1 wherein said display unit comprises an oscillographic storage display unit.

8. Apparatus for non-invasively visualizing blood vessels within a body comprising:
    ultrasonic pulsed Doppler blood velocity detector means including a transducer directing low power ultrasound toward a sample region within said body and detecting ultrasound reflected therefrom;
    an elongate arm supporting said transducer at one end and mounted to extend from an origin at its other end such that said transducer may be moved rotationally and translationally on a substantially planar surface;
    means associated with said origin for sensing the position and orientation of said transducer with respect thereto;
    means combining the position and orientation of said transducer with the distance of said transducer from said sample volume to locate the beam of an oscillographic display unit on its display screen; and
    means measuring said reflected ultrasound and causing the beam of said oscillographic display unit to write a spot on said display screen when the frequency and amplitude of said reflected ultrasound is above a pre-set level, including frequency discriminating means.

9. The apparatus of claim 8 wherein the length of said elongate supporting arm is adjustable such that said transducer may be moved rotationally and translationally to sample a subcutaneous region having substantially planar side surfaces and a thickness equal to the change in length of said arm.

10. Apparatus for non-invasively visualizing blood vessels comprising:
    means intermittently directing low power constant frequency ultrasound toward a blood vessel and detecting ultrasound reflected by moving blood in a vessel at a selected distance from said ultrasound directing means;
    means sensing the position and orientation of said ultrasound directing means;
    display unit means including a display screen and a beam adapted to write a spot on said screen;
    means employing the position and orientation of said ultrasound directing means and the distance of said ultrasound directing means from said moving blood in said vessel to locate said beam on said display screen; and
    means measuring the ultrasound reflected by the moving blood in said vessel and directing said beam to write a spot on said display screen when said means detects ultrasound of a pre-set amplitude and frequency, said means including a frequency discriminating means to eliminate all but blood flow signals.

11. The apparatus of claim 10 wherein said ultrasound directing means includes a transducer directing low power ultrasound toward said blood vessel and detecting and transmitting ultrasound reflected by moving blood in said vessel to an ultrasonic pulsed Doppler blood velocity detector.

12. The apparatus of claim 10 wherein the means sensing the position and orientation of said ultrasonic directing means includes a plurality of potentiometers adapted to individually sense lateral, vertical and rotational movement of said transducer.

13. Apparatus for non-invasively visualizing blood vessels within a body comprising:
   means directing low power ultrasound toward a subcutaneous section of tissue and detecting reflected ultrasound;
   means sensing the position of said ultrasound directing means with respect to said section of tissue to be scanned;
   display unit means including a display screen and a beam adapted to write a spot on said screen;
   means employing the position of said transducer to locate the beam of said display unit on said display screen; and,
   means measuring the reflected ultrasound and directing said beam to write a spot on said display screen when said means directing low power ultrasound detects reflected ultrasound having an amplitude and frequency above a pre-set level, including frequency discriminating means.

14. The apparatus of claim 13 wherein said means directing low power ultrasound toward said subcutaneous section of tissue includes the transducer of a continuous wave Doppler blood velocity detector.

15. The apparatus of claim 13 wherein said means sensing the position of said ultrasound directing means includes first potentiometer means sensing the position of said ultrasound directing means with respect to a first direction and second potentiometer means sensing the position of said ultrasound directing means with respect to a second direction transverse said first direction.

16. A method of non-invasively visualizing subcutaneous blood vessels comprising the steps of:
   directing low power ultrasound toward a subcutaneous section of tissue;
   detecting ultrasound reflected from said subcutaneous section of tissue;
   sensing the position and orientation of said ultrasound directing means with respect to said subcutaneous section of tissue and transforming said sensed information into voltages;
   combining said voltages with a range voltage proportional to the distance of said ultrasound directing means from said subcutaneous section of tissue;
   applying said combined voltages to the beam of an oscillographic display unit to position said beam; and
   measuring the ultrasound reflected from said subcutaneous section of tissue;
   eliminating all but blood flow signals and
   causing the beam of said display unit to write a spot on the screen of said oscillographic display unit when the frequency and amplitude of said ultrasound is above a pre-set level.

* * * * *